(12) United States Patent
Nakashima

(10) Patent No.: US 10,428,208 B2
(45) Date of Patent: Oct. 1, 2019

(54) CROSS-LINKABLE NITRILE RUBBER COMPOSITION AND CROSS-LINKED RUBBER

(71) Applicant: ZEON CORPORATION, Tokyo (JP)

(72) Inventor: Tomonori Nakashima, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/504,739

(22) PCT Filed: Aug. 19, 2015

(86) PCT No.: PCT/JP2015/073201
§ 371 (c)(1),
(2) Date: Feb. 17, 2017

(87) PCT Pub. No.: WO2016/027822
PCT Pub. Date: Feb. 25, 2016

(65) Prior Publication Data
US 2017/0267844 A1    Sep. 21, 2017

(30) Foreign Application Priority Data

Aug. 20, 2014 (JP) ................................ 2014-167463

(51) Int. Cl.
| | |
|---|---|
| *C08L 15/00* | (2006.01) |
| *C08J 3/22* | (2006.01) |
| *C08K 5/098* | (2006.01) |
| *C08K 5/14* | (2006.01) |

(52) U.S. Cl.
CPC .............. *C08L 15/005* (2013.01); *C08J 3/22* (2013.01); *C08K 5/098* (2013.01); *C08K 5/14* (2013.01); *C08L 2205/03* (2013.01); *C08L 2205/06* (2013.01); *C08L 2205/16* (2013.01); *C08L 2312/00* (2013.01)

(58) Field of Classification Search
None
See application file for complete search history.

(56) References Cited

U.S. PATENT DOCUMENTS

| | | |
|---|---|---|
| 2007/0197688 A1 | 8/2007 | Tsukada et al. |
| 2014/0163170 A1 | 6/2014 | Nakashima et al. |
| 2015/0322254 A1* | 11/2015 | Tsukada ................... C08L 1/02 524/35 |

FOREIGN PATENT DOCUMENTS

| | | |
|---|---|---|
| EP | 1 188 790 A1 | 3/2002 |
| JP | S48-18567 B1 | 6/1973 |
| JP | H04-277538 A | 10/1992 |
| JP | WO 2014098168 A1 * | 6/2014 |
| WO | 2005/092971 A1 | 10/2005 |
| WO | 2013/015373 A1 | 1/2013 |

OTHER PUBLICATIONS

February 21, 2017 International Preliminary Report on Patentability issued with International Patent Application No. PCT/JP2015/073201.
Nov. 17, 2015 International Search Report issued in International Patent Application No. PCT/JP2015/073201.
Apr. 5, 2018 Search Report issued in European Application No. 15834347.5.

* cited by examiner

*Primary Examiner* — Ana L. Woodward
(74) *Attorney, Agent, or Firm* — Oliff PLC

(57) ABSTRACT

A cross-linkable nitrile rubber composition including a highly saturated nitrile rubber (A) containing α,β-ethylenically unsaturated nitrile monomer units in a ratio of 10 to 60 wt % and having an iodine value of 120 or less, a master batch (B) containing an ethylene-vinyl acetate copolymer (b1) having a melt flow rate measured under a load of 21.18N at 190° C. of 0.5 to 1000 g/10 min. and containing vinyl acetate monomer units in a ratio of 5 to 50 wt % and an organic staple fiber (b2) having an average fiber length of 0.1 to 12 mm, and a cross-linking agent (C), wherein a ratio of the ethylene-vinyl acetate copolymer (b1) and the organic staple fiber (b2) in the master batch (B) is, in terms of a weight ratio of "ethylene-vinyl acetate copolymer (b1): organic staple fiber (b2)", 30:70 to 80:20 is provided.

13 Claims, No Drawings

CROSS-LINKABLE NITRILE RUBBER COMPOSITION AND CROSS-LINKED RUBBER

TECHNICAL FIELD

The present invention relates to a cross-linkable nitrile rubber composition able to give a cross-linked rubber excellent in tensile stress and tearing strength and to a cross-linked rubber obtained using that cross-linkable nitrile rubber composition.

BACKGROUND ART

Since the past, nitrile rubber (acrylonitrile-butadiene copolymer rubber) has been used as the material for rubber parts such as hoses, belts, and tubes for automobiles by taking advantage of its oil resistance, mechanical properties, chemical resistance, etc. Further, highly saturated nitrile rubber obtained by saturation by hydrogenating the carbon-carbon double bonds in the polymer main chain of the nitrile rubber is further excellent in heat resistance, so is being used for rubber parts such as seals, belts, hoses, and diaphragms.

On the other hand, the technique of mixing staple fiber into rubber such as highly saturated nitrile rubber so as to improve the mechanical properties of the obtained cross-linked rubber is known. However, it is difficult to make staple fiber uniformly disperse in rubber. If just adding staple fiber into rubber, there is the problem that the staple fiber entangled with itself and ended up forming clumps and it is impossible to obtain the desired properties.

In regard to this, Patent Document 1 proposes mixing staple fiber and a plasticizer into a copolymer rubber containing α,β-ethylenically unsaturated nitrile monomer units to obtain a master batch and thereby mixing the staple fiber into the highly saturated nitrile rubber in the state of the master batch. According to the art of this Patent Document 1, it is possible to make the staple fiber disperse well into the highly saturated nitrile rubber, but a plasticizer is used when obtaining the master batch, so as a result, the plasticizer in the obtained cross-linked rubber ends up becoming relatively great in amount, so sometimes bleedout of the plasticizer occurs. Depending on the application for which the obtained cross-linked rubber is used, bleedout of the plasticizer sometimes becomes a problem. Further, the cross-linked rubber obtained in Patent Document 1 is not sufficient in tearing strength either. Further improvement of the tearing strength has been sought.

RELATED ART

Patent Documents

Patent Document 1: International Publication WO2005/092971

SUMMARY OF THE INVENTION

The present invention has as its object to provide a cross-linkable nitrile rubber composition able to give a cross-linked rubber excellent in tensile stress and tearing strength and provide a cross-linked rubber obtained using that cross-linkable nitrile rubber composition.

Means for Solving the Problem

The inventors engaged in intensive research to solve the above problem and as a result discovered that the above object can be achieved by a rubber composition obtained by mixing, into highly saturated nitrile rubber containing α,β-ethylenically unsaturated nitrile monomer units in a ratio of 10 to 60 wt % and having an iodine value of 120 or less, a master batch containing a specific ethylene-vinyl acetate copolymer and organic staple fiber having an average fiber length of 0.1 to 12 mm in a specific ratio and a cross-linking agent and thereby completed the present invention.

That is, according to the present invention, there is provided a cross-linkable nitrile rubber composition comprising a highly saturated nitrile rubber (A) containing α,β-ethylenically unsaturated nitrile monomer units in a ratio of 10 to 60 wt % and having an iodine value of 120 or less, a master batch (B) containing an ethylene-vinyl acetate copolymer (b1) having a melt flow rate measured under a load of 21.18N at 190° C. of 0.5 to 1000 g/10 min. and containing vinyl acetate monomer units in a ratio of 5 to 50 wt % and an organic staple fiber (b2) having an average fiber length of 0.1 to 12 mm, and a cross-linking agent (C), wherein a ratio of the ethylene-vinyl acetate copolymer (b1) and the organic staple fiber (b2) in the master batch (B) is, in terms of a weight ratio of "ethylene-vinyl acetate copolymer (b1) :organic staple fiber (b2)", 30:70 to 80:20.

In the cross-linkable nitrile rubber composition of the present invention, preferably the ratio of content of the master batch (B) is 0.1 to 30 parts by weight with respect to 100 parts by weight of the highly saturated nitrile rubber (A).

In the cross-linkable nitrile rubber composition of the present invention, preferably the cross-linking agent (C) is an organic peroxide cross-linking agent.

In the cross-linkable nitrile rubber composition of the present invention, preferably the organic staple fiber (b1) is pulp-form staple fiber having fibrils.

In the cross-linkable nitrile rubber composition of the present invention, preferably the organic staple fiber (b1) is an aramide staple fiber.

In the cross-linkable nitrile rubber composition of the present invention, preferably the organic staple fiber (b1) is a poly-p-phenylene terephthalamide staple fiber or copoly-p-phenylene-3,4'-oxydiphenylene-terephthalamide staple fiber.

In the cross-linkable nitrile rubber composition of the present invention, preferably the composition further contains an α,β-ethylenically unsaturated carboxylic acid metal salt (D).

In the cross-linkable nitrile rubber composition of the present invention, preferably the α,β-ethylenically unsaturated carboxylic acid metal salt (D) is a salt of acrylic acid or methacrylic acid and at least one type of metal selected from zinc, magnesium, calcium, and aluminum.

Further, according to the present invention, there is provided cross-linked rubber obtained by cross-linking any of the above cross-linkable nitrile rubber compositions.

Effects of Invention

According to the present invention, it is possible to provide a cross-linkable nitrile rubber composition able to give a cross-linked rubber excellent in tensile stress and tearing strength and to provide a cross-linked rubber obtained using that cross-linkable nitrile rubber composition.

DESCRIPTION OF EMBODIMENTS

Cross-Linkable Nitrile Rubber Composition

The cross-linkable nitrile rubber composition of the present invention contains a highly saturated nitrile rubber (A) containing α,β-ethylenically unsaturated nitrile monomer units in a ratio of 10 to 60 wt % and having an iodine value of 120 or less, a master batch (B) containing an ethylene-vinyl acetate copolymer (b1) having a melt flow rate measured under a load of 21.18N at 190° C. of 0.5 to 1000 g/10 min. and containing vinyl acetate monomer units in a ratio of 5 to 50 wt % and an organic staple fiber (b2) having an average fiber length of 0.1 to 12 mm, and a cross-linking agent (C), wherein a ratio of the ethylene-vinyl acetate copolymer (b1) and the organic staple fiber (2) in the master batch (B) is, in tams of a weight ratio of "ethylene-vinyl acetate copolymer (b1) :organic staple fiber (2)", 30:70 to 80:20.

Highly Saturated Nitrile Rubber (A)

The highly saturated nitrile rubber (A) used in the present invention is a rubber containing α,β-ethylenically unsaturated nitrile monomer units in a ratio of 10 to 60 wt % and having an iodine value of 120 or less.

An α,β-ethylenically unsaturated nitrile monomer forming the α,β-ethylenically unsaturated nitrile monomer units contained in the highly saturated nitrile rubber (A) used in the present invention is not particularly limited, but one having 3 to 18 carbon atoms is preferable, while one having 3 to 9 carbon atoms is particularly preferable. As specific examples, acrylonitrile, methacrylonitrile, a-chloroacrylonitrile, etc. may be mentioned. Among these, acrylonitrile is preferable. These α,β-ethylenically unsaturated nitrile monomers may be used as single types alone or may be used as two types or more together.

In the highly saturated nitrile rubber (A), the content of the α,β-ethylenically unsaturated nitrile monomer units is 10 to 60 wt %, preferably 15 to 55 wt %, more preferably 20 to 50 wt %. If the content of the α,β-ethylenically unsaturated nitrile monomer units is too small, the obtained cross-linked rubber is liable to become inferior in oil resistance, while conversely if too large, the cold resistance may fall.

Further, the highly saturated nitrile rubber (A) used in the present invention preferably further contains diene monomer units and/or α-olefin monomer units from the viewpoint of improving the mechanical characteristics by rubber elasticity.

As a diene monomer forming the diene monomer units, conjugated dienes having 4 or more carbon atoms such as 1,3-butadiene, isoprene, 2,3-dimethyl-1,3-butadiene, and 1,3-pentadiene; and nonconjugated dienes having 5 to 12 carbon atoms such as 1,4-pentadiene and 1,4-hexadiene may be mentioned. Among these, conjugated dienes are preferable, while 1,3-butadiene is more preferable. An α-olefin monomer forming the α-olefin monomer units is preferably one having 2 to 12 carbon atoms. Ethylene, propylene, 1-butene, 4-methyl-1-pentene, 1-hexene, 1-octene, etc. may be illustrated. These diene monomers and a-olefin monomers may be used as single types alone or may be used as two types or more together.

In the highly saturated nitrile rubber (A), the content of the diene monomer units and/or α-olefin monomer units is preferably 40 to 90 wt %, more preferably 45 to 85 wt %, still more preferably 50 to 80 wt %. By making the content of the diene monomer units and/or α-olefin monomer units the above range, the obtained cross-linked rubber can be made excellent in rubber elasticity while maintaining well the heat resistance and chemical resistance.

Further, the highly saturated nitrile rubber (A) used in the present invention may contain, in addition to α,β-ethylenically unsaturated nitrile monomer units and diene monomer units and/or α-olefin monomer units, units of other monomers copolymerizable with these monomers. As such other monomers, nonconjugated diene monomers, aromatic vinyl monomers, α,β-ethylenically unsaturated monocarboxylic acids and their esters, α,β-ethylenically unsaturated polyvalent carboxylic acids and their monoesters, polyvalent esters and anhydrides, cross-linkable monomers, copolymerizable antiaging agents, etc. may be mentioned.

As nonconjugated diene monomers, ones having 5 to 12 carbon atoms are preferable. For example, 1,4-pentadiene, 1,4-hexadiene, vinylnorbornene, dicyclopentadiene, etc. may be mentioned.

As aromatic vinyl monomers, for example, styrene, α-methylstyrene, vinylpyridine, etc. may be mentioned.

As α,β-ethylenically unsaturated monocarboxylic acids, for example, acrylic acid, methacrylic acid, crotonic acid, silicic acid, etc. may be preferably mentioned.

As α,β-ethylenically unsaturated monocarboxylic acid esters, for example, ethyl (meth) acrylate (meaning ethyl acrylate and ethyl methacrylate, same below), butyl (meth) acrylate, 2-ethylhexyl (meth) acrylate, 2-methoxyethyl (meth) acrylate, etc. may be mentioned.

As α,β-ethylenically unsaturated polyvalent carboxylic acids, for example, maleic acid, fumaric acid, itaconic acid, etc. may be mentioned.

As α,β-ethylenically unsaturated polyvalent carboxylic acid monoesters, for example, maleic acid monoalkyl esters such as monomethyl maleate, monoethyl maleate, monopropyl maleate, and mono-n-butyl maleate; fumaric acid monoalkyl esters such as monomethyl fumarate, monoethyl fumarate, monopropyl fumarate, and mono-n-butyl fumarate; citraconic acid monoalkyl esters such as monomethyl citraconate, monoethyl citraconate, monopropyl citraconate, and mono-n-butyl citraconate; itaconic acid monoalkyl esters such as monomethyl itaconate, monoethyl itaconate, monopropyl itaconate, and mono-n-butyl itaconate; etc. may be mentioned.

As α,β-ethylenically unsaturated polyvalent carboxylic acid polyvalent esters, for example, dimethyl maleate, di-n-butyl maleate, dimethyl fumarate, di-n-butyl fumarate, dimethyl itaconate, di-n-butyl itaconate, etc. may be mentioned.

As α,β-ethylenically unsaturated polyvalent carboxylic acid anhydrides, for example, maleic anhydride, itaconic anhydride, etc. may be mentioned.

As the cross-linkable monomers, for example, divinyl compounds such as divinylbenzene; di (meth) acrylic acid esters such as ethylene di (meth) acrylate, diethyleneglycol di (meth) acrylate, and ethyleneglycol di (meth) acrylate; trimethacrylic acid esters such as trimethylolpropane tri (meth) acrylate; and other polyfunctional ethylenically unsaturated monomers and also self-cross-linkable monomers such as N-methylol (meth) acrylamide and N,N'-dimethylol (meth) acrylamide etc. may be mentioned.

As copolymerizable antiaging agents, for example, N-(4-anilinophenyl) acrylamide, N-(4-anilinophenyl)methacrylamide, N-(4 -anilinophenyl) cinnamamide, N-(4 -anilinophenyl) crotonamide, N-phenyl-4-(3-vinylbenzyloxy) aniline, N-phenyl-4-(4-vinylbenzyloxy) aniline, etc. may be mentioned.

These copolymerizable other monomers may be used together as a plurality of types. In the highly saturated nitrile rubber (A), the content of the units of other monomers is preferably 50 wt % or less, more preferably 30 wt % or less, still more preferably 10 wt % or less.

The highly saturated nitrile rubber (A) used in the present invention has an iodine value of 120 or less, preferably 80 or less, more preferably 25 or less, still more preferably 15 or less. If the highly saturated nitrile rubber (A) is too high in iodine value, the cross-linked rubber is liable to fall in heat resistance and ozone resistance.

The highly saturated nitrile rubber (A) has a polymer Mooney viscosity ($ML_{1+4}$, 100° C.) of preferably 15 to 200, more preferably 20 to 150, still more preferably 30 to 120. If the highly saturated nitrile rubber (A) is too low in polymer Mooney viscosity, the obtained cross-linked rubber is liable to fall in mechanical properties, while conversely if too high, the cross-linkable nitrile rubber composition may fall in processability.

The method of production of the highly saturated nitrile rubber (A) used in the present invention is not particularly limited, for example, the method of copolymerizing an α,β-ethylenically unsaturated nitrile monomer, diene monomer and/or α-olefin monomer, and other monomers copolymerizable with these added in accordance with need is convenient and preferable. As the polymerization method, any of the known emulsion polymerization method, suspension polymerization method, bulk polymerization method, and solution polymerization method may be used, but since the control of the polymerization reaction is easy, the emulsion polymerization method is preferable. Note that, when the copolymer obtained by copolymerization has an iodine value higher than 120, the copolymer may be hydrogenated (hydrogenation reaction). In this case, the method of hydrogenation is not particularly limited. A known method may be employed.

Master Batch (B)

The master batch (B) used in the present invention contains an ethylene-vinyl acetate copolymer (b1) having a melt flow rate measured under a load of 21.18N at 190° C. of 0.5 to 1000 g/10 min. and containing vinyl acetate monomer units in a ratio of 5 to 50 wt % and organic staple fiber (b2) having an average fiber length of 0.1 to 12 mm.

In the present invention, as the rubber used as the main ingredient forming the composition, highly saturated nitrile rubber (A) containing α,β-ethylenically unsaturated nitrile monomer units in a ratio of 10 to 60 wt % and having an iodine value of 120 or less is used. To this, the master batch obtained by blending the organic staple fiber (b2) into the ethylene-vinyl acetate copolymer (b1) is mixed. Due to this, the dispersability of the organic staple fiber (b2) in the composition can be made particularly excellent. Further, according to the present invention, by making the dispersability of the organic staple fiber (b2) particularly excellent, it is possible to make the obtained cross-linked rubber particularly excellent in tensile stress and tearing strength.

On the other hand, when using a rubber other than highly saturated nitrile rubber or using a resin as the main ingredient forming the composition or even when using highly saturated nitrile rubber, when the content of the α,β-ethylenically unsaturated nitrile monomer units or the iodine value is outside the above ranges, the kneadability of the rubber composition and the compression set resistance and low temperature embrittlement resistance of the cross-linked rubber end up deteriorating. In contrast, according to the present invention, by employing the above constitution, it is possible to make the obtained cross-linked rubber particularly excellent in tensile stress and tearing strength without such problems occurring.

The ethylene-vinyl acetate copolymer (b1) is not particularly limited so long as a copolymer of ethylene and vinyl acetate and having a melt flow rate and content of vinyl acetate monomer units in the above range. It may also be one with rubber-like or resin-like properties.

The ethylene-vinyl acetate copolymer (b1) used in the present invention has a melt flow rate (MFR) of 0.5 to 1000 g/10 min., preferably 1 to 900 g/10 min., more preferably 10 to 500 g/10 min. By the melt flow rate being in the above range, the affinity with the highly saturated nitrile rubber (A) and organic staple fiber (b2) can be made better. Note that, the melt flow rate of the ethylene-vinyl acetate copolymer (b1) is measured based on ASTM D1238 under conditions of 190° C./21.18N (190° C./2.16 kg).

Further, the ethylene-vinyl acetate copolymer (b1) used in the present invention has a ratio of content of the vinyl acetate monomer units of 5 to 50 wt %, preferably 10 to 45 wt %, more preferably 20 to 40 wt %. By making the ratio of content of the vinyl acetate monomer units the above range, it is possible to improve the affinity with the highly saturated nitrile rubber (A) and organic staple fiber (b2). Due to this, it is possible to make the dispersability of the organic staple fiber (b2) in the highly saturated nitrile rubber (A) better.

The organic staple fiber (b2) used in the present invention is not particularly limited so long as a fibrous organic material having an average fiber length of 0.1 to 12 mm. Note that, the average fiber length of the organic staple fiber (b2) can be found, for example, by taking a photograph by an optical microscope, measuring the lengths of 100 staple fibers randomly selected in the obtained photograph, and calculating the arithmetic average of the measured lengths. If the average fiber length is too short, the obtained cross-linked rubber is liable to fall in tensile stress, while if the average fiber length is too long, when making the master batch together with the ethylene-vinyl acetate copolymer (b1), making the master batch is liable to become difficult. The average fiber length of the organic staple fiber (b2) is preferably 0.5 to 10 mm, more preferably 0.5 to 6 mm.

As the organic staple fiber (b2) used in the present invention, natural fiber such as cotton and wood cellulose fiber; fiber comprised of a synthetic resin such as a polyamide, polyester, polyvinyl alcohol, rayon, poly-p-phenylene benzobisoxazole, polyethylene, polypropylene, polyarylate, polyimide, polyphenylene sulfide, polyether ether ketone, polylactic acid, polycaprolactone, polybutylene succinate, and a fluorine-based polymer; etc. may be illustrated. Among these as well, since the effect of the present invention becomes much more remarkable, use of staple fiber comprised of a synthetic resin is preferable, while use of staple fiber comprised of a polyamide is more preferable.

As the polyamide, aliphatic polyamides such as polycapramide, poly-ω-aminoheptanoic acid, poly-ω-aminononanoic acid, polyundecaneamide, polyethylenediamine adipamide, polytetramethylene adipamide, polyhexamethylene adipamide, polyhexamethylene sebacamide, polyhexamethylene dodecamide, polyoctamethylene adipamide, and polydecamethylene adipamide; aromatic polyamides (aramide) such as poly-p-phenylene terephthalamide (product name "Kevlar", made by Toray Dupont), poly-m-phenylene isophthalamide (product name "Conex", made by Teijin Technoproducts), copoly-p-phenylene-3, 4'-oxydiphenylene-terephthalamide (product name "Technora", made by Teijin Technoproducts), poly-m-xylylene adipamide, poly-m-xylylene pimelamide, poly-m-xylylene azelamide, poly-p-xylylene azelamide, and poly-p-xylylene decanamide; etc. may be mentioned. Among these as well, from the viewpoint of being able to further improve the obtained cross-linked rubber in tensile stress and tearing strength, aromatic polyamide, that is, aramide, is preferable, poly-p-phenylene terephthalamide, poly-m-phenylene isophthalamide, and copoly-p-phenylene-3, 4'-oxydiphenylene-terephthalamide are more preferable, and copoly-p-phenylene-3, 4'-oxydiphenylene-terephthalamide is particularly preferable.

That is, as the staple fiber comprised of a polyamide, an aramide staple fiber is preferable, a poly-p-phenylene terephthalamide staple fiber, poly-m-phenylene isophthalamide staple fiber, and copoly-p-phenylene-3, 4'-oxydiphenylene-terephthalamide staple fiber are more preferable, and a poly-p-phenylene terephthalamide staple fiber and copoly-p-phenylene-3, 4'-oxydiphenylene-terephthalamide staple fiber are particularly preferable.

Further, the organic staple fiber (b2) used in the present invention may be chopped fiber (cut fiber) in form or may be a pulp-form having fibrils, but a pulp-form staple fiber having fibrils (fibrillated pulp-form staple fiber) is preferable. In particular, a pulp-form aramide staple fiber having fibrils (fibrillated pulp-form aramide staple fiber) is more preferable. By using the pulp-form staple fiber having fibrils, in particular the pulp-foam aramide staple fiber having fibrils, the obtained cross-linked rubber can be further raised in tensile stress and tearing strength.

The pulp-form aramide staple fiber having fibrils is not particularly limited, but, for example, one comprised of aramide staple fiber with a heat decomposition temperature of 250° C. or more and 700° C. or less which is further fibrillated into microfibers to make the surface fluffy can be used.

In the master batch (B) used in the present invention, the ratio of the ethylene-vinyl acetate copolymer (b1) and the organic staple fiber (b2) is, in terms of a weight ratio of "ethylene-vinyl acetate copolymer (b1):organic staple fiber (b2)", 30:70 to 80:20, preferably 35:65 to 75:25, more preferably 40:60 to 70:30. By making the ratio of the ethylene-vinyl acetate copolymer (b1) and the organic staple fiber (b2) the above range, it is possible to make the organic staple fiber (b2) sufficiently disperse in the cross-linkable nitrile rubber composition and thereby suitably obtain the effect of improvement of the tensile stress and tearing strength of the obtained cross-linked rubber. If the ethylene-vinyl acetate copolymer (b1) is too small in amount, the organic staple fiber (b2) ends up insufficiently dispersing into the cross-linkable nitrile rubber composition and the effect of inclusion of the organic staple fiber (b2), that is, the effect of improvement of the tensile stress and tearing strength of the obtained cross-linked rubber, ends up no longer being able to be obtained. Similarly, if the organic staple fiber (b2) is too small in amount, the effect of improvement of the obtained cross-linked rubber in tensile stress and tearing strength ends up no longer being able to be obtained.

Note that, the master batch (B) may also contain, to an extent not impairing the effect of the present invention, other additives such as a filler, antiaging agent, antioxidant, photostabilizer, IN absorber, processing aid, slip agent, and lubricant. The contents of these other additives are usually 30 wt % or less in the master batch (B), more preferably 15 wt % or less, particularly preferably 5 wt % or less.

Further, in the cross-linkable nitrile rubber composition of the present invention, the content of the master batch (B) is preferably 0.1 to 30 parts by weight with respect to 100 parts by weight of the highly saturated nitrile rubber (A), more preferably 1 to 25 parts by weight, still more preferably 3 to 20 parts by weight. By making the content of the organic staple fiber (b2) in the cross-linkable nitrile rubber composition of the present invention the above range, the obtained cross-linked rubber can be further raised in effect of improvement of tensile stress and tearing strength.

The master batch (B) used in the present invention can be prepared by mixing the ethylene-vinyl acetate copolymer (b1) and the organic staple fiber (b2). The method of mixing the ethylene-vinyl acetate copolymer (b1) and the organic staple fiber (b2) is not particularly limited so long as a method enabling these to be uniformly mixed, but the method of adding the organic staple fiber (b2) during the polymerization of the ethylene-vinyl acetate copolymer (b1) or during the melting and kneading of the ethylene-vinyl acetate copolymer (b1) etc. may be mentioned. As the method of adding the organic staple fiber (b2) during the melting and kneading of the ethylene-vinyl acetate copolymer (b1), for example, the method of adding the ethylene-vinyl acetate copolymer (b1) and organic staple fiber (b2) to an extruder such as a twin-screw extruder and melting and kneading them in the extruder etc. may be mentioned.

Cross-Linking Agent (C)

The cross-linking agent (C) used in the present invention is not particularly limited. An organic peroxide cross-linking agent, polyamine cross-linking agent, sulfur-based cross-linking agent, etc. maybe mentioned, but an organic peroxide cross-linking agent is preferable. By using a cross-linking agent (C) comprised of an organic peroxide cross-linking agent, the cross-linkable nitrile rubber composition is improved in processability and, further, the obtained cross-linked rubber can be made particularly excellent in tensile strength.

As the organic peroxide cross-linking agent, one known in the past can be used. Dicumyl peroxide, cumen hydroperoxide, t-butylcumyl peroxide, p-menthane hydroperoxide, di-t-butylperoxide, 1,3-bis(t-butylperoxyisopropyl)benzene, 1,4-bis(t-butylperoxyisopropyl)benzene, 1,1-di-t-butylperoxy-3,3-trimethylcyclohexane, 4,4-bis-(t-butyl-peroxy)-n-butylvalerate, 2,5-dimethyl-2,5-di-t-butylperoxyhexane, 2,5-dimethyl-2,5-di-t-butylperoxyhexine-3,1,1-di-t-butylperoxy-3,5,5-trimethylcyclohexane, p-chlorobenzoyl peroxide, t-butylperoxyisopropyl carbonate, t-butylperoxybenzoate, etc. may be mentioned. Among these as well, 1,3-bis(t-butylperoxyisopropyl)benzene is preferable. These maybe used as single types alone or as a plurality of types combined.

In the cross-linkable nitrile rubber composition of the present invention, the amount of the cross-linking agent (C) is preferably 0.5 to 20 parts by weight with respect to 100 parts by weight of the highly saturated nitrile rubber (A), more preferably 1 to 15 parts by weight, still more preferably 2 to 10 parts by weight. If the amount of the cross-linking agent (C) is too small, the obtained cross-linked rubber is liable to fall in mechanical properties. On the other hand, if too large, the obtained cross-linked rubber may deteriorate in fatigue resistance.

$\alpha,\beta$-ethylenically Unsaturated Carboxylic Acid Metal Salt (D)

Further, the cross-linkable nitrile rubber composition of the present invention may further contain, in addition to the above highly saturated nitrile rubber (A), master batch (B), and cross-linking agent (C), an $\alpha,\beta$-ethylenically unsaturated carboxylic acid metal salt (D). By further including the $\alpha,\beta$-ethylenically unsaturated carboxylic acid metal salt (D), the obtained cross-linked rubber can be further raised in mechanical strength. The $\alpha,\beta$-ethylenically unsaturated carboxylic acid metal salt (D) is not particularly limited so long as a salt of an α,β-ethylenically unsaturated carboxylic acid and a metal.

As the α,β-ethylenically unsaturated carboxylic acid foaming the α,β-ethylenically unsaturated carboxylic acid metal salt (D), one having at least a monovalent, free (not esterified) carboxyl group, for example, an α,β-ethylenically unsaturated monocarboxylic acid, α,β-ethylenically unsaturated dicarboxylic acid, α,β-ethylenically unsaturated dicarboxylic acid monoester, etc. may be mentioned.

As the α,β-ethylenically unsaturated monocarboxylic acid, acrylic acid, methacrylic acid, crotonic acid, 3-butenoic acid, etc. maybe mentioned.

As the α,β-ethylenically unsaturated dicarboxylic acid, maleic acid, fumaric acid, itaconic acid, etc. may be mentioned.

As the α,β-ethylenically unsaturated dicarboxylic acid monoester, monomethyl maleate, monoethyl maleate, monomethyl itaconate, monoethyl itaconate, etc. may be mentioned.

Among these as well, from the viewpoint of being able to further raise the obtained cross-linked rubber in mechanical strength, an α,β-ethylenically unsaturated carboxylic acid not having an ester group is preferable, an α,β-ethylenically unsaturated monocarboxylic acid is more preferable, and acrylic acid and methacrylic acid are particularly preferable.

As the metal forming the α,β-ethylenically unsaturated carboxylic acid metal salt (D), for example, zinc, magnesium, calcium, barium, titanium, chromium, iron, cobalt, nickel, aluminum, tin, lead, etc. may be mentioned. Among these as well, from the viewpoint of further improving the obtained cross-linked rubber in mechanical strength, zinc, magnesium, calcium, and aluminum are preferable, while zinc is particularly preferable.

Note that, in the present invention, the α,β-ethylenically unsaturated carboxylic acid metal salt (D) may also be produced by mixing, into the highly saturated nitrile rubber (A), an α,β-ethylenically unsaturated carboxylic acid and a metal or metal compound for forming the α,β-ethylenically unsaturated carboxylic acid metal salt (D) and causing the two to react in the highly saturated nitrile rubber (A). By producing an α,β-ethylenically unsaturated carboxylic acid metal salt (D) by such a method, it is possible to make the obtained α,β-ethylenically unsaturated carboxylic acid metal salt (D) disperse well into the highly saturated nitrile rubber (A). Note that, as the metal compound used in this case, oxides, hydroxides, carbonates, etc. of the above-mentioned metals may be mentioned. Among these as well, zinc oxide and zinc carbonate are preferably used.

When blending, into the highly saturated nitrile rubber (A), the α,β-ethylenically unsaturated carboxylic acid and the metal or metal compound to cause the formation of an α,β-ethylenically unsaturated carboxylic acid metal salt (D), the metal or metal compound is reacted by inclusion in an amount of preferably 0.5 to 4 moles with 1 mole of the α,β-ethylenically unsaturated carboxylic acid, more preferably 0.7 to 3 moles. If the amount of the metal or metal compound used is too small or too large, the reaction between the α,β-ethylenically unsaturated carboxylic acid and the metal or metal compound will become difficult.

Further, the α,β-ethylenically unsaturated carboxylic acid metal salt (D) is preferably fine in size so long as no problem arises in handling. In particular, it is preferably one with a ratio of content of particles of a volume average particle size of 20 μm or more of not more than 5%. To make the α,β-ethylenically unsaturated carboxylic acid metal salt (D) finer in size in this way, it is sufficient to use the method of classifying the α,β-ethylenically unsaturated carboxylic acid metal salt (D) by a wind force classifier or sieve classifier. Alternatively, when blending in an α,β-ethylenically unsaturated carboxylic acid and a metal or metal compound to cause the formation of an α,β-ethylenically unsaturated carboxylic acid metal salt (D) in the highly saturated nitrile rubber (A), the α,β-ethylenically unsaturated carboxylic acid metal salt (D) may be made finer in size by the method of classifying the metal or metal compound using a wind force classifier or sieve classifier etc.

In the cross-linkable nitrile rubber composition of the present invention, the content of the α,β-ethylenically unsaturated carboxylic acid metal salt (D) is preferably 5 to 100 parts by weight with respect to 100 parts by weight of the highly saturated nitrile rubber (A), more preferably 10 to 50 parts by weight, still more preferably 15 to 30 parts by weight. By making the content of the α,β-ethylenically unsaturated carboxylic acid metal salt (D) the above range, it is possible to further raise the effect of improvement of the mechanical strength of the obtained cross-linked rubber.

Other Ingredients

Further, the cross-linkable nitrile rubber composition of the present invention may have blended into it, in addition to the above, other compounding agents which are usually used in the field of rubber processing, for example, a reinforcing agent such as carbon black and silica, a filler such as calcium carbonate, talc, and clay, metal oxide such as zinc oxide and magnesium oxide, co-cross-linking agent, cross-linking accelerator, cross-linking aid, cross-linking retarder, antiaging agent, antioxidant, photostabilizer, scorch preventer such as primary amine, activator such as diethyleneglycol, silane coupling agent, plasticizer, processing aid, slip agent, tackifier, lubricant, flame retardant, antifungal agent, acid acceptor, antistatic agent, pigment, foaming agent, etc. The amounts of these compounding agents are not particularly limited so long as in ranges not impairing the object and effects of the present invention. As the amounts of these compounding agents, amounts according to the purposes of inclusion may be suitably employed.

As the carbon black, for example, furnace black, acetylene black, thermal black, channel black, graphite, etc. may be mentioned. These may be used as single types or as a plurality of types combined.

As the silica, natural silica such as quartz powder and silicastone powder; synthetic silica such as anhydrous silicic acid (silica gel, aerosil, etc.) and hydrous silicic acid; etc. may be mentioned. Among these as well, synthetic silica is preferable. Further, these silicas may be surface treated by a silane coupling agent etc.

The silane coupling agent is not particularly limited, but as specific examples, silane coupling agents containing sulfur such as γ-mercaptopropyl trimethoxysilane, γ-mercaptomethyl trimethoxysilane, γ-mercaptomethyl triethoxysilane, γ-mercaptohexamethyl disilazane, bis (3-triethoxysilylpropyl) tetrasulfane, and bis (3-triethoxysilylpropyl) disulfane; epoxy group-containing silane coupling agents such as γ-glycidoxypropyltrimethoxysilane, γ-glycidoxypropylmethyldimethoxysilane, β-(3, 4-epoxycyclohexyl) ethyltrimethoxysilane, γ-mercaptopropyltrimethoxysilane, and γ-glycidoxypropylmethyldiethoxysilane; amino group-containing silane coupling agents such as N-(β-aminoethyl)-γ-aminopropyltrimethoxysilane, γ-aminopropyltrimethoxysilane, γ-aminopropyltriethoxysilane, N-2-(aminoethyl)-3-aminopropyltrimethoxysilane, N-2-(aminoethyl)-3-aminopropyltriethoxysilane, 3-triethoxysilyl-N-(1,3-dimethyl-butylidene)propylamine, and N-phenyl-3-aminopropyltrimethoxysilane; (meth) acryloxy group-containing silane coupling agents such as γ-methacryloxypropyltrimethoxysilane, γ-methacryloxypropyltris (β-methoxyethoxy) silane, γ-methacryloxypropylmethyldimethoxysilane, γ-methacryloxypropylmethyldiethoxysilane, γ-methacryloxypropyltriethoxysilane, and γ-acryloxypropyltrimethoxysilane; vinyl group-containing silane coupling agents such as vinyltrimethoxysilane, vinyltriethoxysilane, vinyltris (β-methoxyethoxy) silane, vinyltrichlorosilane, and vinyltriacetoxysilane; chloropropyl group-containing silane coupling agents such as 3-chloropropyltrimethoxysilane; isocyanate group-containing silane coupling agents such as 3-isocyanatepropyltriethoxysilane; styryl group-containing silane coupling agents such as p-styryltrimethoxysilane; ureide group-containing silane coupling agents such as 3-ureidopropyltriethoxysilane; allyl group-containing silane coupling agents such as diallyldimethylsilane; alkoxy group-containing silane coupling agents such as tetraethoxysilane; phenyl group-containing silane coupling agents such as diphenyldimethoxysilane; fluoro group-containing silane coupling agents such as trifluoropropyltrimethoxysilane; alkyl group-containing silane coupling agents such as isobutyltrimethoxysilane and cyclohexylmethyldimethoxysilane; aluminum-based coupling agents such as acetoalkoxyaluminum diisopropylate; a titanate-based coupling agent such as isopropyltriisostearoyl titanate, isopropyltris (dioctylpyrophosphate) titanate, isopropyltri (N-aminoethyl-aminoethyl) titanate, tetraoctylbis (ditridecylphosphite) titanate, tetra (2,2-diallyloxymethyl-1-butyl) bis (ditridecyl) phosphite titanate, bis (dioctylpyrophosphate) oxyacetate titanate, bis (dioctylpyrophosphate) ethylene titanate, tetraisopropylbis (dioctylphosphite) titanate, and isopropyltriisostearoyl titanate; etc. may be mentioned. These may be used as single types or as a plurality of types combined.

The co-cross-linking agent is not particularly limited, but a low molecular weight or high molecular weight compound having several radical reactive unsaturated groups in its molecule is preferable, for example, polyfunctional vinyl compounds such as divinylbenzene and divinylnaphthalene; isocyanurates such as triallyl isocyanurate and trimethallyl isocyanurate; cyanurates such as triallyl cyanurate; maleimides such as N,N'-m-phenylene dimaleimide; allyl esters of polyvalent acid such as diallyl phthalate, diallyl isophthalate, diallyl maleate, diallyl fumarate, diallyl sebacate, and triallyl phosphate; diethyleneglycolbisallyl carbonate; allyl ethers such as ethyleneglycol diallyl ether, trimethylolpropane triallyl ether, and partial allyl ether of pentaerythrit; allyl-modified resins such as allylated novolac resin and allylated resol resin; tri-to pentafunctional methacrylate compounds or acrylate compounds such as trimethylolpropane trimethacrylate and trimethylolpropane triacrylate; etc. may be mentioned. These may be used as single types or as a plurality of types combined.

The plasticizer is not particularly limited, but a trimellitic acid-based plasticizer or ether ester-based plasticizer etc. can be used. As specific examples, tri-2-ethylhexyl trimellitate, trimellitic acid isononyl ester, bis[2-(2-butoxyethoxy)ethyl] adipate, diheptanoate, di-2-ethylhexanoate, didecanoate, etc. may be mentioned. These maybe used as single types or as a plurality of types combined.

Note that, in the obtained cross-linked rubber, from the viewpoint of preventing bleed, the amount of the plasticizer is preferably 15 parts by weight or less with respect to 100 parts by weight of the highly saturated nitrile rubber (A), more preferably 12 parts by weight or less.

Furthermore, the cross-linkable nitrile rubber composition of the present invention may contain, to an extent where the effect of the present invention is not impaired, another polymer besides the above-mentioned highly saturated nitrile rubber (A) and ethylene-vinyl acetate copolymer (b1). As the other polymer, acrylic rubber, ethylene-acrylic acid copolymer rubber, fluororubber, styrene-butadiene copolymer rubber, polybutadiene rubber, ethylene-propylene copolymer rubber, ethylene-propylene-diene ternary copolymer rubber, epichlorohydrin rubber, urethane rubber, chloroprene rubber, silicone rubber, fluorosilicone rubber, chlorosulfonated polyethylene rubber, natural rubber, polyisoprene rubber, etc. may be mentioned. In the case of mixing in the other polymer, the amount in the cross-linkable nitrile rubber composition is preferably 30 parts by weight or less with respect to 100 parts by weight of the highly saturated nitrile rubber (A), more preferably 20 parts by weight or less, still more preferably 10 parts by weight or less.

Production of Cross-Linkable Nitrile Rubber Composition

The cross-linkable nitrile rubber composition of the present invention is prepared by mixing the above ingredients in preferably a nonaqueous system. The mixing method is not limited, but the composition can be prepared by kneading the ingredients other than the cross-linking agent (C) and the cross-linking aid etc. unstable against heat by a mixing machine such as a Bambury mixer, internal mixer, and kneader for primary kneading, then transferring the mixture to rolls etc. and adding the cross-linking agent (C) etc. for secondary kneading. Note that, the primary kneading is usually performed at 10 to 200° C., preferably 30 to 180° C., for 1 minute to 1 hour, preferably 1 minute to 30 minutes, while the secondary kneading is usually performed at 10 to 100° C., preferably 20 to 60° C., for 1 minute to 1 hour, preferably 1 minute to 30 minutes. At this time, the ethylene-vinyl acetate copolymer (b1) and organic staple fiber (b2) are mixed in advance to form a master batch (B) and are mixed with the other ingredients in the state of the master batch (B).

Cross-Linked Rubber

The cross-linked rubber of the present invention is obtained by cross-linking the above-mentioned cross-linkable nitrile rubber composition of the present invention.

The cross-linked rubber of the present invention can be produced by forming the cross-linkable nitrile rubber composition of the present invention by, for example, a forming machine corresponding to the shape of the product to be produced, for example, an extruder, injection molding machine, press, rolls, etc., heating it to cause a cross-linking reaction, then fixing the shape as cross-linked rubber. In this case, the composition can be formed in advance, then cross-linked or may be formed and simultaneously cross-linked. The forming temperature is usually 10 to 200° C., preferably 25 to 120° C. The cross-linking temperature is usually 100 to 200° C., preferably is 130 to 190° C., while the cross-linking time is usually 1 minute to 24 hours, preferably 2 minutes to 12 hours, particularly preferably 3 minutes to 6 hours.

Further, the cross-linked rubber sometimes may be cross-linked at its surface, but not sufficiently cross-linked at its inside depending upon its shape, size, etc., so may be further heated for secondary cross-linking.

As the cross-linking method, a general method used for cross-linking rubber such as press cross-linking, steam cross-linking, and oven cross-linking may be suitably selected.

The thus obtained cross-linked rubber of the present invention is one obtained using the cross-linkable nitrile rubber composition of the present invention, so is excellent in tensile stress and tearing strength.

For this reason, the cross-linked rubber of the present invention, taking advantage of such a characteristic, can be used for various seal members such as O-rings, packings, diaphragms, oil seals, shaft seals, bearing seals, well head seals, air compressor seals, seals for sealing in Freon or fluorohydrocarbons or carbon dioxide which is used for compressors for cooling devices for air conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, etc.), valves and valve seats, BOP (blow out preventers), and bladders; various types of gaskets such as intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator use gaskets which are attached between pairs of housings straddling unit cells provided with positive electrodes, electrolyte plates, and negative electrodes, and top cover use gaskets for hard disk drives; various types of rolls such as printing use rolls, ironmaking use rolls, paper-making use rolls, industrial use rolls, and office equipment use rolls; various types of belts such as flat belts (film core flat belts, cord flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, top cog V-ribbed belts, etc.), CVT use belts, timing belts, toothed belts, and conveyor belts; various types of hoses such as fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, and flow lines; and various types of boots such as CVJ boots, propeller shaft boots, constant velocity joint boots, and rack and pinion boots; attenuating member rubber parts such as cushion materials, dynamic dampers, rubber couplings, air springs, shock absorbers, and clutch facing materials; dust covers, automotive interior members, friction materials, tires, covered cables, shoe soles, electromagnetic wave shields, binders for flexible printed circuits boards or other binders, fuel cell separators and also other broad applications in the electronics field. Among these as well, since the cross-linked rubber of the present invention is particularly excellent in tensile stress and tearing strength, it is suitable as a belt, hose, roll, seal, or gasket, in particular is especially suitable as a belt.

EXAMPLES

Below, the present invention will be explained based on more detailed examples, but the present invention is not limited to these examples. Note that, below, unless particularly indicated otherwise, "parts" are based on weight. Further, the tests and evaluations were conducted as follows.

Original State Physical Properties (Tensile Strength, Elongation, 25% Tensile Stress, 50% Tensile Stress, 100% Tensile Stress)

The cross-linkable nitrile rubber composition was placed into a vertical 15 cm, horizontal 15 cm, depth 0.2 cm mold and pressed at a press pressure of 10 MPa while heating it at 170° C. for 20 minutes for press forming to obtain sheet shaped cross-linked rubber. Next, the obtained cross-linked rubber was punched in the grain direction by a No. 3 dumbbell die to prepare a test piece. Further, the obtained test piece was used according to JIS K6251 to measure the tensile strength, elongation, 25% tensile stress, 50% tensile stress, and 100% tensile stress.

Tearing Strength

In the same way as measurement of the above original state physical properties above, sheet-shaped cross-linked rubber was obtained. In accordance with JIS K6252, the obtained sheet-shaped cross-linked rubber was punched by an angle-type punch without nick to obtain a test piece, and a tearing test was performed in the grain direction to measure the tearing strength.

Example 1

Using a Bambury mixer, 100 parts of highly saturated nitrile rubber (product name "Zetpol 2010L", made by Zeon Corporation, iodine value 11, acrylonitrile units 36.2 wt %, polymer Mooney viscosity 58 ($ML_{1+4}$, 100° C.), 15 parts of zinc methacrylate, 25 parts of SRF carbon black (product name "Seast S", carbonblack), 10 parts of zinc oxide, 10 parts of tri-2-ethylhexyl trimellitate (product name "ADK Cizer C-8", made by Adeka, plasticizer), 1.5 parts of 4,4'-di-(α,α-dimethylbenzyl) diphenylamine (product name "Nocrac CD", made by Ouchi Shinko Chemical Industrial, antiaging agent), 1.5 parts of 2-mercaptobenzoimidazole zinc salt (product name "Nocrac MBZ", made by Ouchi Shinko Chemical Industrial, antiaging agent), and 7 parts of staple fiber master batch (M1) (product name "Keplar EE 1K1034", made by Toray Dupont, fibrillated pulp-form staple fiber of poly-p-phenylene terephthalamide having average fiber length of 1.1 mm:50 wt %, ethylene-vinyl acetate copolymer (vinyl acetate units 28 wt %, melt flow rate (MFR) at 190° C./21.18N (190° C./2.16 kg) according to ASTM D1238 of 400 g/10 min.):50 wt %) were kneaded at a chamber temperature setting of 50° C. for 5 minutes. Next, the mixture was transferred to open rolls, 10 parts of 1,3-bis (t-butylperoxyisopropyl) benzene 40% product (product name "Vul Cup 40KE", made by Arkema, organic peroxide cross-linking agent) was mixed in and kneaded at 50° C. for 5 minutes to obtain a cross-linkable nitrile rubber composition.

Further, the obtained cross-linkable nitrile rubber composition was used in accordance with the above-mentioned methods to evaluate the original state physical properties and tearing strength. The results are shown in Table 1.

Example 2

Except for using 10 parts of polyether ester (product name "ADK Cizer RS-700", made by Adeka, plasticizer) instead of 10 parts of tri-2-ethylhexyl trimellitate, the same procedure was followed as in Example 1 to prepare a cross-linkable nitrile rubber composition and the same procedures were followed to evaluate it. The results are shown in Table 1.

Example 3

Except for using 15 parts of zinc acrylate instead of 15 parts of zinc methacrylate, the same procedure was followed as in Example 1 to prepare a cross-linkable nitrile rubber composition and the same procedures were followed to evaluate it. The results are shown in Table 1.

Example 4

Except for changing the amount of the staple fiber master batch (M1) from 7 parts to 11 parts, the same procedure was followed as in Example 1 to prepare a cross-linkable nitrile rubber composition and the same procedures were followed to evaluate it. The results are shown in Table 1.

Comparative Example 1

Except for using, instead of 7 parts of staple fiber master batch (M1), 5.69 parts of staple fiber master batch (M2) (product name "Keplar EE 1K3239", made by Toray Dupont, pulp-form staple fiber of poly-p-phenylene terephthalamide with average fiber length of 1.1 mm:61.5 wt %, ethylene-octene binary copolymer (MFR at 190° C./21.18N (190° C./2.16 kg) of 20 g/10 min.):38.5 wt %), the same procedure was followed as in Example 1 to prepare a cross-linkable nitrile rubber composition and the same procedures were followed to evaluate it. The results are shown in Table 1.

Comparative Example 2

Except for using, instead of 7 parts of staple fiber master batch (M1), 8.75 parts of staple fiber master batch (M3) (product name "Rhenogran P91-40/EPDM", made by Rhein Chemie, pulp-form staple fiber of poly-p-phenylene terephthalamide with average fiber length of 1.4 mm:40 wt %, ethylene-propylene-diene rubber: 60 wt %), the same procedure was followed as in Example 1 to prepare a cross-linkable nitrile rubber composition and the same procedures were followed to evaluate it. The results are shown in Table 1.

Comparative Example 3

Except for using, instead of 7 parts of staple fiber master batch (M1), 8.75 parts of staple fiber master batch (M4) (product name "Rhenogran P91-40/NBR", made by Rhein Chemie, pulp-form staple fiber of poly-p-phenylene terephthalamide with average fiber length of 1.4 mm:40 wt %, nitrile rubber: 60 wt %), the same procedure was followed as in Example 1 to prepare a cross-linkable nitrile rubber composition and the same procedures were followed to evaluate it. The results are shown in Table 1.

Comparative Example 4

Except for using, instead of 7 parts of staple fiber master batch (M1), 3.5 parts of pulp-form staple fiber (product name "Towaron pulp 1091", made by Teijin, pulp-form staple fiber of poly-p-phenylene terephthalamide with average fiber length of 1.4 mm) as is without forming it into a master batch, the same procedure was followed as in Example 1 to prepare a cross-linkable nitrile rubber composition and the same procedures were followed to evaluate it. The results are shown in Table 1.

Comparative Example 5

Except for using, instead of 7 parts of staple fiber master batch (M1), 3.5 parts of chopped fiber (cut fiber)—form staple fiber (product name "Towaron 1589 Chopped Fiber 1 mm", made by Teijin, chopped fiber form staple fiber of poly-p-phenylene terephthalamide with average fiber length of 1 mm) as is without forming it into a master batch, the same procedure was followed as in Example 1 to prepare a cross-linkable nitrile rubber composition and the same procedures were followed to evaluate it. The results are shown in Table 1.

Comparative Example 6

Except for changing the amount of the staple fiber master batch (M4) from 8.75 parts to 13.75 parts, the same procedure was followed as in Comparative Example 3 to prepare a cross-linkable nitrile rubber composition and the same procedures were followed to evaluate it. The results are shown in Table 1.

Comparative Example 7

Except for not mixing in the staple fiber master batch (M1), the same procedure was followed as in Example 1 to prepare a cross-linkable nitrile rubber composition and the same procedures were followed to evaluate it. The results are shown in Table 1.

TABLE 1

|  |  | Examples | | | | Comparative Examples | | | | | | |
|---|---|---|---|---|---|---|---|---|---|---|---|---|
|  |  | 1 | 2 | 3 | 4 | 1 | 2 | 3 | 4 | 5 | 6 | 7 |
| Formulation of cross-linkable nitrile rubber composition | | | | | | | | | | | | |
| Highly saturated nitrile rubber | (parts) | 100 | 100 | 100 | 100 | 100 | 100 | 100 | 100 | 100 | 100 | 100 |
| Staple fiber master batch (M1) (poly-p-phenylene terephthalamide pulp-form staple fiber: 50 wt %, ethylene-vinyl acetate copolymer: 50 wt %) | (parts) | 7 | 7 | 7 | 11 | | | | | | | |
| Staple fiber master batch (M2) (poly-p-phenylene terephthalamide pulp-form staple fiber: 61.5 wt %, ethylene-octene binary copolymer: 38.5 wt %) | (parts) | | | | | 5.69 | | | | | | |
| Staple fiber master batch (M3) (poly-p-phenylene terephthalamide pulp-form staple fiber: 40 wt %, ethylene-propylene-diene rubber: 60 wt %) | (parts) | | | | | | 8.75 | | | | | |

TABLE 1-continued

| | | Examples | | | | Comparative Examples | | | | | | |
|---|---|---|---|---|---|---|---|---|---|---|---|---|
| | | 1 | 2 | 3 | 4 | 1 | 2 | 3 | 4 | 5 | 6 | 7 |
| Staple fiber master batch (M4) (poly-p-phenylene terephthalamide pulp-form staple fiber: 40 wt %, nitrile rubber: 60 wt %) | (parts) | | | | | | | 8.75 | | | 13.75 | |
| Poly-p-phenylene terephthalamide pulp-form staple fiber | (parts) | | | | | | | | 3.5 | | | |
| Poly-p-phenylene terephthalamide chopped fiber-form staple fiber | (parts) | | | | | | | | | 3.5 | | |
| Zinc methacrylate | (parts) | 15 | 15 | | 15 | 15 | 15 | 15 | 15 | 15 | 15 | 15.5 |
| Zinc acrylate | (parts) | | | 15 | | | | | | | | |
| SRF carbon black | (parts) | 25 | 25 | 25 | 25 | 25 | 25 | 25 | 25 | 25 | 25 | 25 |
| Zinc oxide | (parts) | 10 | 10 | 10 | 10 | 10 | 10 | 10 | 10 | 10 | 10 | 10 |
| Tri-2-ethylhexyl trimellitate | (parts) | 10 | | 10 | 10 | 10 | 10 | 10 | 10 | 10 | 10 | 10 |
| Polyether ester | (parts) | | 10 | | | | | | | | | |
| 4,4'-di-(α,α-dimethylbenzyl)diphenylamine | (parts) | 1.5 | 1.5 | 1.5 | 1.5 | 1.5 | 1.5 | 1.5 | 1.5 | 1.5 | 1.5 | 1.5 |
| 2-mercaptobenzoimidazol zinc salt | (parts) | 1.5 | 1.5 | 1.5 | 1.5 | 1.5 | 1.5 | 1.5 | 1.5 | 1.5 | 1.5 | 1.5 |
| 1,3-bis(t-butylperoxyisopropyl)benzene 40% product | (parts) | 10 | 10 | 10 | 10 | 10 | 10 | 10 | 10 | 10 | 10 | 10 |
| Evaluation | | | | | | | | | | | | |
| Tensile strength (MPa) | | 23.5 | 24.7 | 23.7 | 23.9 | 24.4 | 24.3 | 23.9 | Many clumps of staple fiber, evaluative not possible | 27.6 | 22.1 | 26.9 |
| Elongation (%) | | 360 | 400 | 370 | 350 | 380 | 350 | 380 | | 380 | 330 | 470 |
| 25% tensile stress (MPa) | | 9.48 | 9.33 | 9.44 | 11.7 | 5.73 | 8.19 | 7.81 | | 4.50 | 8.41 | 1.13 |
| 50% tensile stress (MPa) | | 11.9 | 11.7 | 12.3 | 13.1 | 9.83 | 10.9 | 10.8 | | 7.52 | 10.6 | 1.7 |
| 100% tensile stress (MPa) | | 13.1 | 12.9 | 13.5 | 13.9 | 11.5 | 11.7 | 11.6 | | 8.44 | 11.4 | 69 |
| Tearing strength (angle type with no nick) (N/mm) | | 81.4 | 82.3 | 80.9 | 82.5 | 72.4 | 69.3 | 70.5 | | 71.7 | 68.3 | 70.2 |

As shown in Table 1, the cross-linked rubber obtained by cross-linking a cross-linkable nitrile rubber composition containing a highly saturated nitrile rubber (A), a master batch (B) containing an ethylene-vinyl acetate copolymer (b1) and organic staple fiber (b2) in the predetermined ratio of the present invention and a cross-linking agent (C) exhibited a high tensile stress and was also high in tearing strength so was excellent (Examples 1 to 4).

On the other hand, when using a staple fiber master batch containing a binder other than the ethylene-vinyl acetate copolymer (b1), the obtained cross-linked rubber was low in tensile stress and also inferior in tearing strength (Comparative Examples 1 to 3 and 6).

Further, when mixing in the pulp-form organic staple fiber as is without forming it into a master batch, the obtained cross-linked rubber contained innumerable clumps of staple fiber in the cross-linked rubber and the above evaluations could not be performed (Comparative Example 4).

When mixing in the cut fiber-form organic staple fiber as is without forming it into a master batch, the obtained cross-linked rubber was low in tensile stress and also inferior in tearing strength (Comparative Example 5).

Furthermore, when not mixing in organic staple fiber, the tensile stress was extremely low and the tearing strength was also inferior (Comparative Example 7).

The invention claimed is:

1. A cross-linkable nitrile rubber composition comprising a highly saturated nitrile rubber (A) containing α,β-ethylenically unsaturated nitrile monomer units in a ratio of from 10 to 60 wt % and having an iodine value of 120 or less,
a master batch (B) containing an ethylene-vinyl acetate copolymer (b1) having a melt flow rate measured under a load of 21.18N at 190° C. of from 0.5 to 1000 g/10 min. and containing vinyl acetate monomer units in a ratio of from 5 to 50 wt % and an organic staple fiber (b2) having an average fiber length of from 0.5 to 12 mm, and
a cross-linking agent (C),
wherein a ratio of a weight of the ethylene-vinyl acetate copolymer (b1) to a weight of the organic staple fiber (b2) in the master batch (B) is in a range of from 30:70 to 80:20.

2. The cross-linkable nitrile rubber composition according to claim 1, wherein the ratio of content of the master batch (B) is 0.1 to 30 parts by weight with respect to 100 parts by weight of the highly saturated nitrile rubber (A).

3. The cross-linkable nitrile rubber composition according to claim 1, wherein the cross-linking agent (C) is an organic peroxide cross-linking agent.

4. The cross-linkable nitrile rubber composition according to claim 1, wherein the organic staple fiber (b2) is pulp-form staple fiber having fibrils.

5. The cross-linkable nitrile rubber composition according to claim 1, wherein the organic staple fiber (b2) is an aramide staple fiber.

6. The cross-linkable nitrile rubber composition according to claim 5, wherein the organic staple fiber (b2) is a poly-p-phenylene terephthalamide staple fiber or copoly-p-phenylene-3,4'-oxydiphenylene-terephthalamide staple fiber.

7. The cross-linkable nitrile rubber composition according to claim 1, further comprising an α,β-ethylenically unsaturated carboxylic acid metal salt (D).

8. The cross-linkable nitrile rubber composition according to claim 7, wherein the α,β-ethylenically unsaturated carboxylic acid metal salt (D) is a salt of acrylic acid or methacrylic acid and at least one type of metal selected from zinc, magnesium, calcium, and aluminum.

9. A cross-linked rubber obtained by cross-linking the cross-linkable nitrile rubber composition according to claim 1.

10. The cross-linkable nitrile rubber composition according to claim 1, wherein the ratio of the weight of the ethylene-vinyl acetate copolymer (b1) to the weight of the organic staple fiber (b2) in the master batch (B) is in a range of from 35:65 to 75:25.

11. The cross-linkable nitrile rubber composition according to claim 1, wherein the ratio of the weight of the ethylene-vinyl acetate copolymer (b1) to the weight of the organic staple fiber (b2) in the master batch (B) is in a range of from 40:60 to 70:30.

12. The cross-linkable nitrile rubber composition according to claim 1, wherein the average fiber length is from 0.5 to 10 mm.

13. The cross-linkable nitrile rubber composition according to claim 12, wherein the average fiber length is from 0.5 to 6 mm.

* * * * *